Nov. 19, 1946.  D. E. KEECH  2,411,214
CHAIN BEARING SEAL
Filed March 4, 1943
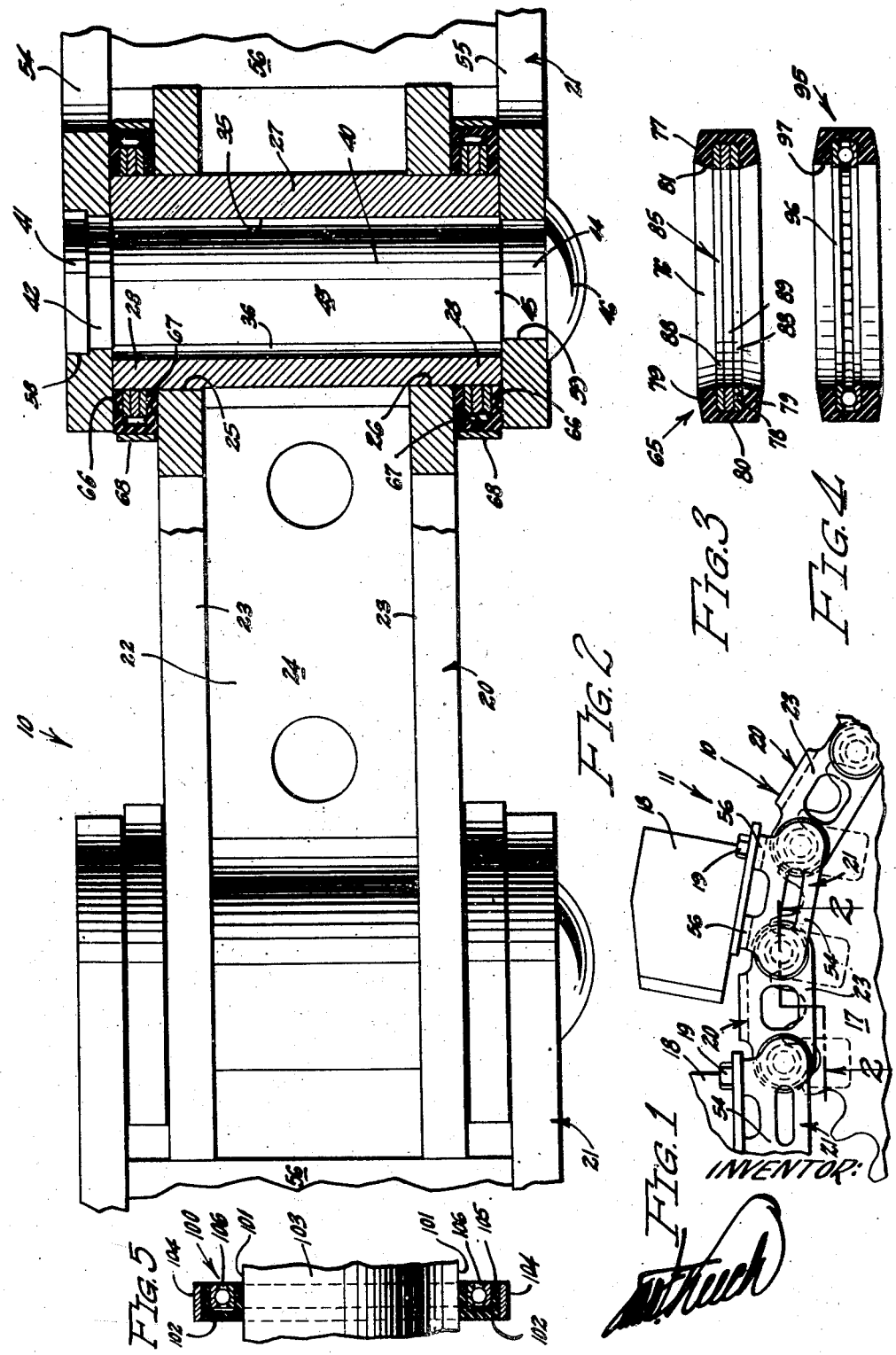

Patented Nov. 19, 1946

2,411,214

UNITED STATES PATENT OFFICE 2,411,214

CHAIN BEARING SEAL

Dana E. Keech, Riverside, Calif., assignor to Food Machinery Corporation, San Jose, Calif., a corporation of Delaware Application March 4, 1943, Serial No. 477,940

1 Claim. (Cl. 286—11)

This invention relates to flexible seals, and is particularly useful in protecting chain bearings.

It is a broad object of the invention to provide a flexible seal which will completely exclude passage of liquid or solid material inwardly or outwardly through an annular area surrounding an axis of rotation between two adjacent members.

In heavy chains, such as used in the tracklaying belts employed on tractors, military tanks and amphibians, the problem of protecting the chain bearings by keeping these lubricated and preventing abrasive material gaining access thereto, is a difficult one as it is necessary for these chains to operate constantly in the presence of large quantities of abrasives and, not infrequently, under water.

It is another object of my invention to provide a chain bearing seal which will retain lubricant within the bearing and exclude foreign matter from said bearings over long periods of operation under difficult conditions.

It is a further object of my invention to provide such a chain bearing seal which is especially adapted for use on the chains employed in tracklaying belts as aforesaid.

The manner of accomplishing the foregoing objects, as well as further objects and advantages, will be made manifest in the following description taken in connection with the accompanying drawing in which:

Fig. 1 is a fragmentary side elevational view of a track-laying belt such as used on amphibians, this belt including an endless chain incorporating the preferred embodiment of my invention.

Fig. 2 is an enlarged cross sectional view taken on the line 2—2 of Fig. 1.

Fig. 3 is a cross sectional view showing a preferred form of the seal element of my invention, as this element appears before it is compressed when assembled with the chain.

Fig. 4 is a view similar to Fig. 3, illustrating a modified form of the seal element of my invention.

Fig. 5 is a diagrammatic cross sectional view of another modified form of my invention.

Referring specifically to the drawing, Fig. 1 shows a chain 10 which is part of a track-laying belt 11, such as is suitable for use on an amphibian (not shown). The chain 10 is shown as traveling around a sprocket 17 and having grousers 18 secured thereto by bolts 19. This chain includes inside or bearing links 20 and outside or plate links 21. Each bearing link 20 includes a channel-shaped body 22 having side walls 23 joined by a back plate 24, opposite ends of the side walls extending beyond said back plate and having co-axial openings 25 and 26. Driven into these openings is a bearing sleeve 27, ends 28 of this sleeve having substantially the same outside diameters and being left extending outwardly from outer faces of the walls 23. The sleeve 27 has a journal bore 35, and a lubricant groove 36 which is packed with grease when the chain is assembled. Journalling in this bore is a link pin 40 of an adjacent link 21. The pin 40 preferably has a head 41 with a shoulder 42 formed between this head and the shank 43 of the pin. This shank is turned down at the opposite end 44 of the pin to provide a shoulder 45. When the chain is assembled, the pin end 44 is swedged to provide a rivet head 46.

Each link 21 includes side plates 54 and 55 which are formed integral with and united by back straps 56 (see Fig. 1), which are adapted to have the grousers 18 mounted thereon. The side plates 54 and 55 overlie the sleeve ends 28 (see Fig. 2), and have concentric openings 58 and 59 into which the pin head 41, shoulder 42 and pin end 44 snugly fit when the chain is assembled. When the swedged head 46 is formed on the pin 40 in the assembly of the chain, this binds the plate 55 between this head and the shoulder 45 on the pin and confines the sleeve 27 between the side plates 54 and 55 with the precise spacing provided on the pin 40 between the shoulders 42 and 45. This is just enough to permit free rotation between the sleeve 27 and the link 21 as long as the bearing surfaces are lubricated.

When assembling the chain 10, sealing elements 65 are placed over the sleeve ends 28 and compressed between opposed radial faces 66 and 67 of the plates 54 and 55 and the side walls 23. Although not essential to the invention, I also prefer to position a circular metal band 68 about each of the elements 65 when it is thus assembled with the chain 10.

The elements 65 are preferably made as shown in Fig. 3, to include a unitary ring 76 made of molded rubber or a suitable substitute therefor, and are preferably made of a grease-resistant synthetic rubber. The material in this ring is preferably of a soft synthetic rubber of a durometer hardness of from 25 to 40. The term "rubber" when used hereinafter without qualification is to be construed broadly as covering any of the various types of resilient materials suitable for use in the rings 76. The side surfaces 77 of the ring 76 are preferably bevelled, as shown, but under some circumstances it may be desirable to have these lie in radial planes.

The rubber ring 76 is formed with an internal annular channel 78, which divides the ring 76 into relatively thick side walls 79 and a relatively thin annular flexing wall 80. Faces 81 of the walls 79 are preferably also bevelled (see Fig. 3).

Inserted into the channel 78 is a thrust bearing 85. This is preferably of the plural ring type as shown in Fig. 3, or it may comprise any other suitable type of bearing.

The bearing 85 is shown as comprising steel rings 88 disposed on opposite sides of a self-lubricating, porous-bronze ring 89.

When the chain 10 is assembled with seal elements 65 disposed over the bushing ends 28, as shown in Fig. 2, the side walls 79 of the rubber ring 76 are compressed between the link faces 66 and 67 and the bearing rings 88 so as to set up a relatively high degree of friction between the rubber ring faces 77 and the link faces 66 and 67. At the same time, there is a relatively small amount of friction between the bronze ring 89 and the steel rings 88 of the bearing 85. Thus when adjacent links 20 and 21 of the chain 10 are flexed relative to each other by rotational movement about the axis of the pin 40, there is a high degree of resistance to slippage between the seal element faces 77 and the link faces 66 and 67. This results in a torsional flexing of the annular ring walls 80 which, as shown in Fig. 2, are expanded outwardly from contact with the bearings 85 by the compression of the rubber side walls 79 when the chain is assembled. The walls 80 may be allowed to expand outwardly into contact with the circular steel bands 68 without hurting the operation of the invention. This is because the relatively soft character of the rubber used in the ring 76 makes the walls 80 contact the bands 68 with a relatively light pressure, so that any rubbing between these elements does not produce any substantial wearing of either.

While I preferably employ two of the rings 88 with one of the rings 89 in each bearing 85, this bearing might be made with only two rings, one of which is steel and the other of which is bronze, and obtain practical results.

I have found in actual use of the invention, as illustrated in Figs. 1, 2 and 3, with the rubber ring 76 made of "neoprene" with a durometer hardness of 30, as well as in other instances with a durometer hardness of 40, that a flexing of the links equipped with these elements of 30° on each side of neutral could be obtained without damage being done to the ring 76, and without causing any slippage between the ring faces 77 and the link faces 66 and 67.

The seal element 65 of my invention may be designed so that the friction between the ring faces 77 and the link faces 66 and 67 is so great that no matter how much the links be flexed relative to each other there will be no slippage between the element 65 and these link faces. When thus designed it would be possible by excessive flexing of the links to damage the rubber ring 76 as by rupturing the outer flexing wall 80 thereof. In the design illustrated in Figs. 1, 2 and 3, an insufficient amount of friction is produced between the rubber ring faces 77 and the link faces 66 and 67 to prevent slippage between these faces when the links are flexed excessively relative to each other. This design is preferable in that it will prevent the damaging of the sealing elements 65 which might otherwise take place when the chains 10 are removed and coiled up incidental to the servicing and repair of the vehicles equipped with these chains.

The sealing element 95 illustrated in Fig. 4, is similar to the sealing element 65, excepting that it has a ball thrust bearing 96 in place of the flat ring thrust bearing 85 and has wall surfaces 97 of larger inside diameter than the bearing 96. This latter feature is to prevent too much friction developing between the seal 95 and a sleeve end 28 when assembled thereon and compressed axially. The sealing element 95 operates in identically the same manner as the sealing element 65 which is described hereinabove. The thrust bearing 96, of course, will develop less friction than the thrust bearing 85, but would be somewhat more expensive and less convenient to install and less dependable in service. In cases where reduction of the friction in the bearing of the sealing element is of great importance, however, the ball thrust bearing 96 might be superior to the flat ring thrust bearing 85.

While the sealing element of my invention preferably operates in planes disposed radially relative to the axis of rotation involved, the surfaces between which the sealing ring of my invention is compressed might comprise concentric cylindrical surfaces in which case the channel 78 would open at one end of the rubber ring 76, instead of centrally, and the bearing of my sealing element instead of being an axial thrust bearing, would be a radial bearing.

A sealing element 100 of this type is shown in Fig. 5. This element is compressed between coaxial cylindrical surfaces 101 and 102 of elements 103 and 104 and includes a channelled rubber ring 105 enclosing a radial ball bearing 106.

I claim:

A seal for an annular area surrounding an axis of rotation between two members providing opposed adjacent surfaces and having rotational movement relative to each other about said axis, said seal comprising: a non-yielding bearing disposed in said area and having opposite outside faces disposed in spaced relation with said surfaces; and a rubber annulus having annular portions compressed between said faces and said surfaces and an annular impervious flexing portion connecting the annular portions aforesaid.

DANA E. KEECH.